United States Patent

Kaneko et al.

[11] Patent Number: 5,253,187
[45] Date of Patent: Oct. 12, 1993

[54] COORDINATE INPUT APPARATUS

[75] Inventors: Kiyoshi Kaneko, Yokohama; Katsuyuki Kobayashi, Tokyo; Takeshi Kamono, Yokohama; Ryozo Yanagisawa, Matsudo; Shinnosuke Taniishi, Kawasaki; Yuichiro Yoshimura, Yokohama; Atsushi Tanaka, Kawasaki, all of Japan

[73] Assignee: Canon Kabushiki Kaisha, Tokyo, Japan

[21] Appl. No.: 837,695

[22] Filed: Feb. 19, 1992

Related U.S. Application Data

[63] Continuation of Ser. No. 433,348, Nov. 8, 1989, abandoned.

[30] Foreign Application Priority Data

Nov. 11, 1988 [JP] Japan .................. 63-283861
Nov. 11, 1988 [JP] Japan .................. 63-283862
Nov. 11, 1988 [JP] Japan .................. 63-283863
Jul. 11, 1989 [JP] Japan .................. 1-177011

[51] Int. Cl.$^5$ .................................... G06F 15/20
[52] U.S. Cl. ............................. 364/560; 178/18; 178/19; 364/556; 367/907
[58] Field of Search ............... 33/1 P, 1 CC; 178/18, 178/19; 340/686; 364/556, 560; 367/907

[56] References Cited

U.S. PATENT DOCUMENTS

| | | | |
|---|---|---|---|
| 3,808,364 | 4/1974 | Veith | 178/19 |
| 3,857,022 | 12/1974 | Rebane et al. | 364/514 |
| 4,488,000 | 12/1984 | Glenn | 178/18 R |
| 4,564,928 | 1/1986 | Glenn et al. | 178/18 X |
| 4,662,282 | 5/1987 | Sato et al. | 178/18 |
| 4,745,565 | 5/1988 | Garwin et al. | 178/18 X |
| 4,853,494 | 8/1989 | Suzuki | 178/18 |
| 4,853,496 | 8/1989 | Taniishi | 367/907 X |
| 4,886,943 | 12/1989 | Suzuki et al. | 367/907 X |
| 4,887,245 | 12/1989 | Mori et al. | 178/18 |
| 4,897,510 | 1/1990 | Tanaka et al. | 367/907 X |
| 4,910,363 | 3/1990 | Kobayashi et al. | 367/907 X |
| 4,931,965 | 6/1990 | Kaneko et al. | 364/560 |
| 4,980,518 | 12/1990 | Kobayashi et al. | 178/18 |
| 5,017,913 | 5/1991 | Kaneko et al. | 178/18 |
| 5,097,102 | 3/1992 | Yoshimura et al. | 178/18 |
| 5,177,472 | 1/1993 | Taniishi et al. | 340/706 |

FOREIGN PATENT DOCUMENTS

0169538 1/1986 European Pat. Off. .
0258972 3/1988 European Pat. Off. .

Primary Examiner—Edward R. Cosimano
Attorney, Agent, or Firm—Fitzpatrick, Cella, Harper & Scinto

[57] ABSTRACT

A coordinate input apparatus in which a vibration which was input by a vibration input pen is detected by vibration sensors attached to a vibration propagating plate such as a transparent glass plate or the like and the coordinates of the position of the pen on the plate are detected. The apparatus includes an envelope output circuit to output envelope signals of detection signals of the sensors; a filter circuit for filtering the envelope signals; a gate signal output circuit for detecting a portion, exceeding a predetermined threshold value, of the envelope signal output from the filter circuit and for outputting a gate signal; a first detector for detecting the peak of the envelope signal output from the envelope output circuit and for detecting the envelope signal by using the peak as a reference; a second detector for detecting a phase signal of the detection signal by using the leading edge of the phase signal as a reference in the period of time during which the gate signal output from the gate signal is output circuit; and a calculating circuit to calculate the position coordinates of the input pen on the basis of the propagation time of the envelope signal detected by the first detector and the propagation time of the phase signal detected by the second detector.

37 Claims, 11 Drawing Sheets

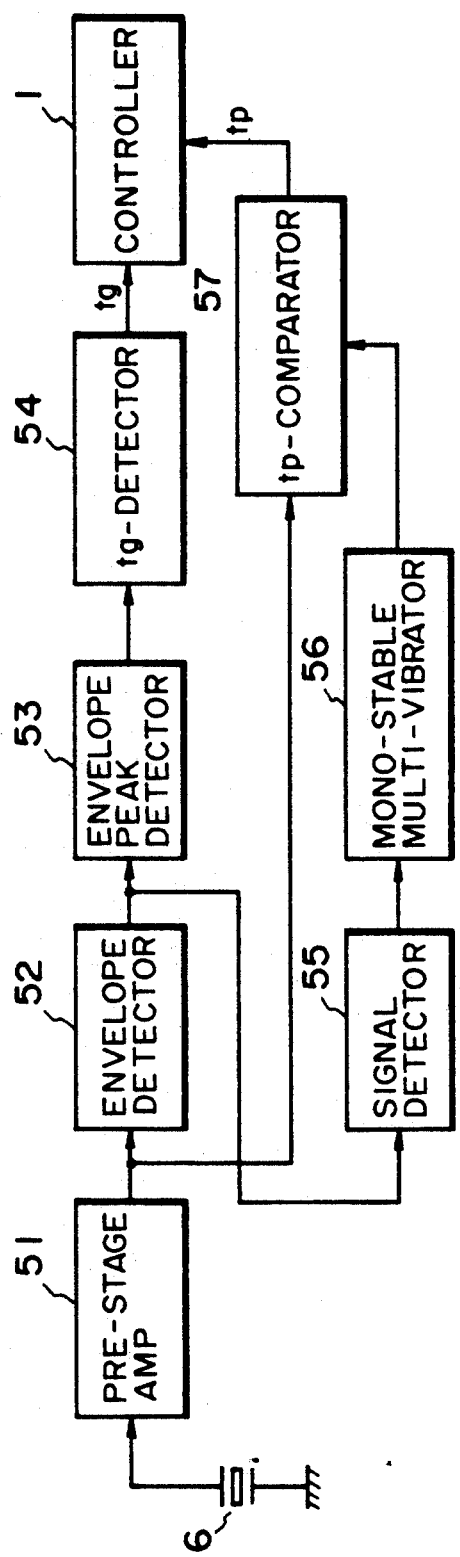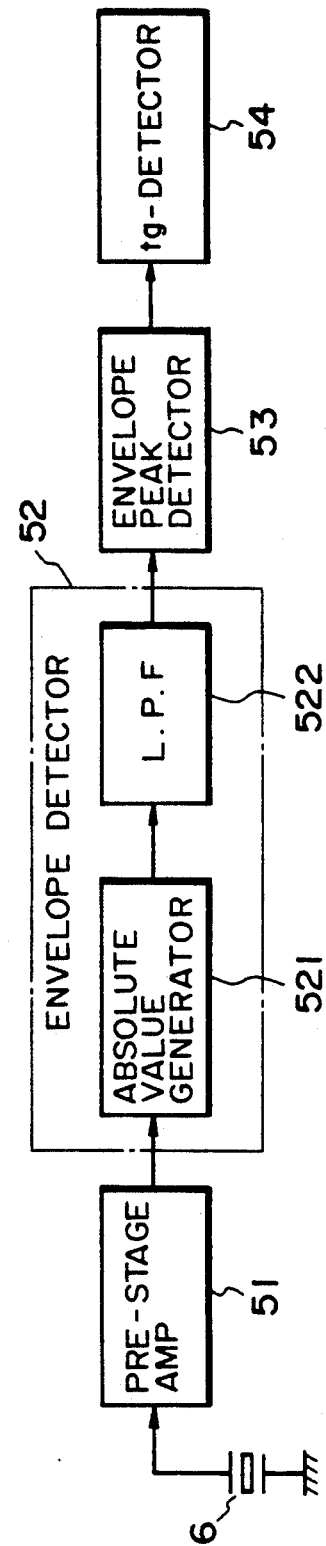
FIG. 5
FIG. 6

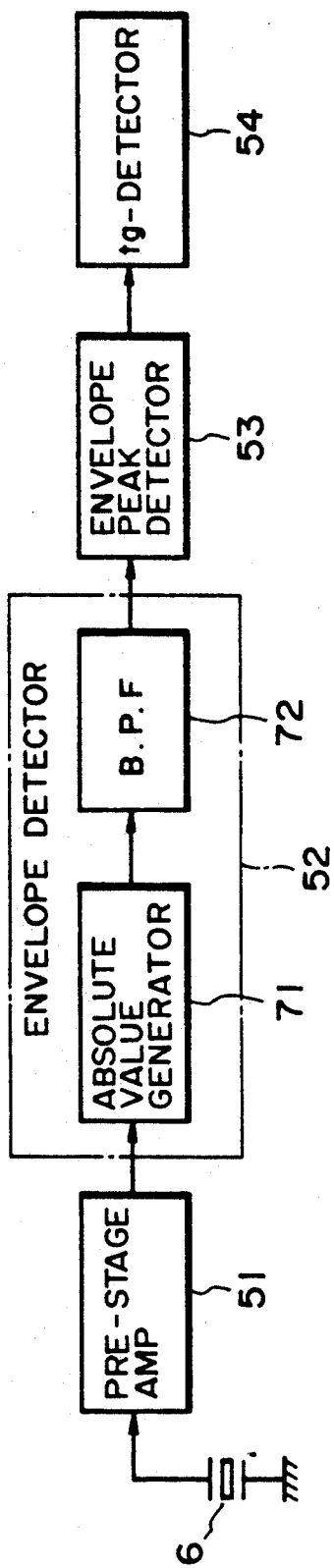
FIG. 12
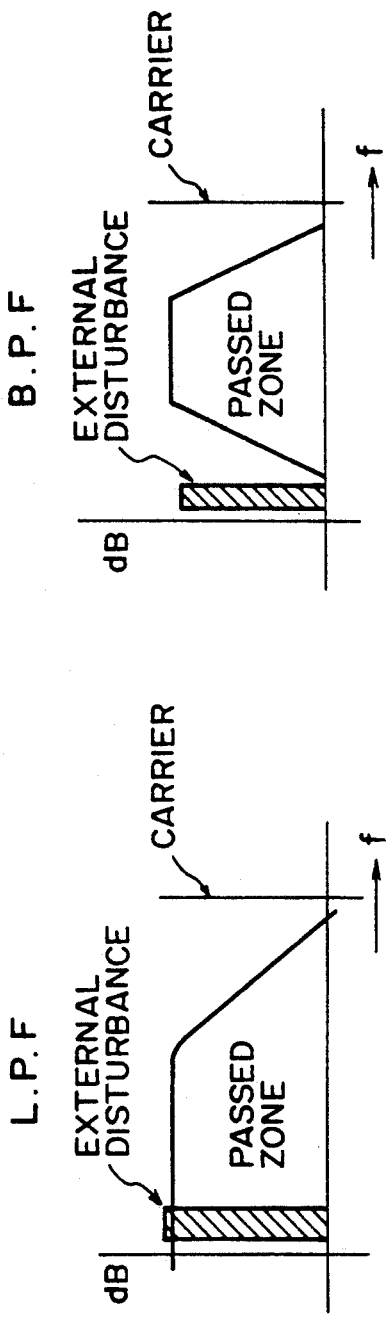
FIG. 13A
FIG. 13B

COORDINATE INPUT APPARATUS

This application is a continuation of application Ser. No. 07/433,348 filed Nov. 8, 1989 now abandoned.

BACKGROUND OF THE INVENTION

1. Field of the Invention

The present invention relates to a coordinate input apparatus and, more particularly, to a coordinate input apparatus in which a vibration which was input by a vibration pen is detected by a plurality of vibration sensors attached to a vibration propagating plate and the coordinates of the vibration pen on the vibration propagating plate are detected.

2. Related Background Art

A coordinate input apparatus in which the lateral wave component of the plate wave elastic wave which was input onto a vibration propagating plate by a vibration input pen is detected and the coordinates of the vibration input point are calculated has been disclosed in a commonly-assigned U.S. Pat. No. 4,931,965 filed on Jun. 30, 1989, and issued Jun. 5, 1990 by Kaneko et al.

In the above apparatus, the accurate distance from the input point is obtained from the relation between the vibration propagation time based on the group velocity (group envelope signal) and the vibration propagation time based on the phase velocity (phase signal). In the apparatus, the detection timing of the vibration propagation time due to the envelope signal is used as a reference and the vibration propagation time due to the phase signal is detected.

That is, since there is a predetermined relation between the group envelope signal and the phase signal in accordance with the vibration propagation distance, a predetermined characteristic point (for instance, the peak point) is first detected with respect to the envelope signal and is compared with a predetermined threshold value with respect to the phase signal by using the detected timing as a reference. For instance, in the portion in which the phase signal first exceeds the predetermined threshold value, a gate signal of a predetermined time width is given. Further, the first leading point (zero-cross point) of the phase signal in the gate signal is detected. Due to this, the vibration propagation time can be stably detected in terms of the detecting system.

However, since a time lag generally occurs in the detection of the characteristic point of the group envelope signal, if the detection timing is used as a reference, the unstable signal portion of the rear portion of the phase signal is detected with respect to the phase signal. That is, FIG. 14 is a diagram showing an example of the signal detected by the vibration sensor. In the diagram, a central portion a is constructed by a stable wavelength (frequency) but a rear portion b is constructed by an unstable wavelength (frequency) which is being attenuated and is oscillating.

It is also considered a method whereby a delay circuit is provided for a phase signal circuit in order to match with the delay time in the detection of the characteristic point of the envelope signal as mentioned above. However, this results in increase in the cost of the apparatus.

On the other hand, there is also a case where the vibration sensor receives external disturbance noises or where noises of another circuit, for instance, a digital signal processing system or the like are mixed into the detection signal of the vibration sensor. Therefore, if the gate signal is given on the basis of such an unstable detection signal, the determination of the input coordinates also becomes unstable.

SUMMARY OF THE INVENTION

It is the first object of the invention to provide a coordinate input apparatus which can obtain accurate coordinates of an input point by a simple construction.

The second object of the invention is to provide a coordinate input apparatus in which an envelope signal detected by a vibration sensor is subjected to a filtering process and the coordinate position is calculated on the basis of the signal subjected to the filtering processed and a phase signal detected by the vibration sensor.

The third object of the invention is to provide a coordinate input-apparatus in which an envelope signal detected by the vibration sensor is subjected to a filtering process and a primary differentiating process and the coordinate position is calculated on the basis of the signal subjected to the filtering process and the primary differentiating process and a phase signal detected by the vibration sensor.

The fourth object of the invention is to provide a coordinate input apparatus in which an envelope signal detected by a vibration sensor is subjected to a filtering process and a secondary differentiating process and the coordinate position is calculated on the basis of the signal subjected to the filtering process and the secondary differentiating process and a phase signal detected by the vibration sensor.

The fifth object of the invention is to provide a coordinate input apparatus which can stably input coordinates without being influenced by external disturbance noises.

BRIEF DESCRIPTION OF THE DRAWINGS

FIG. 5 is a block constructional diagram of a signal waveform detector in the first embodiment;

FIG. 6 is a block constructional diagram of an envelope detector 52 in the first embodiment;

FIG. 12 is a block constructional diagram of an envelope detector in the fourth embodiment;

FIGS. 13A and 13B are diagrams for explaining the frequency characteristics of an LPF and a BPF, respectively;

DETAILED DESCRIPTION OF THE PREFERRED EMBODIMENTS

Embodiments according to the present invention will be described in detail hereinbelow with reference to the drawings.

First Embodiment

The first embodiment relates to the case where a gate signal is generated by comparing an output signal of a filter circuit with a predetermined threshold value.

Figure 1:
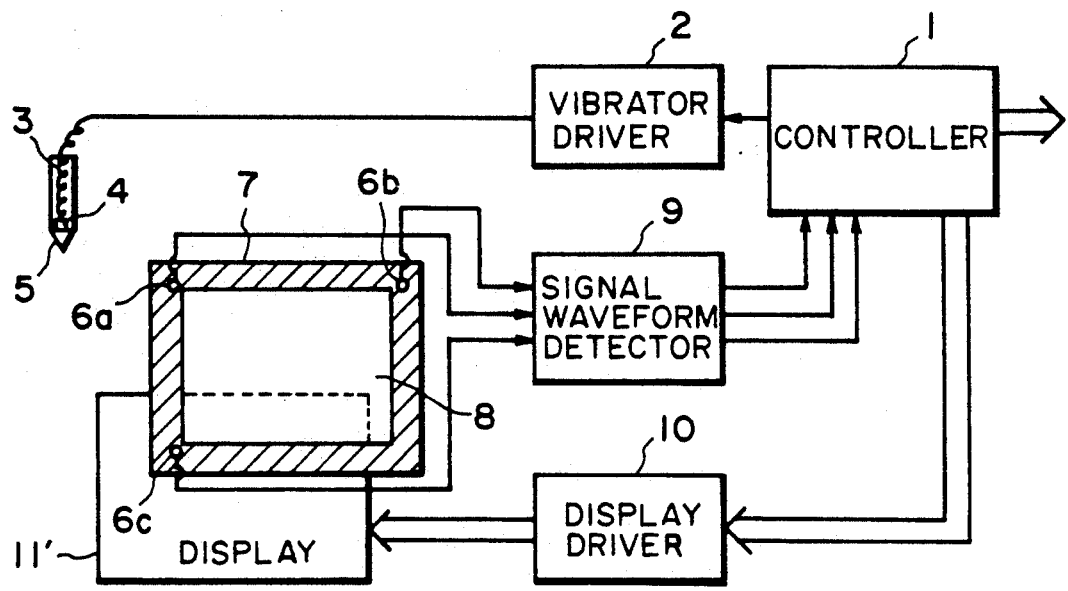
FIG. 1 is a block constructional diagram of a coordinate input apparatus of the first embodiment.

FIG. 1 is a block constructional diagram of a coordinate input apparatus of the first embodiment. In the diagram, reference numeral 3 denotes a vibration pen. The user grasps the pen 3 by the hand and inputs coordinates to an arbitrary position on a vibration propagating plate 8. The pen 3 has therein a vibrator 4 comprising a piezoelectric element or the like. An ultrasonic vibration which is generated by the vibrator 4 is propagated to the plate 8 through a horn portion 5 having a pointed tip. Reference numeral 2 indicates a vibrator driver to drive the vibrator 4 by ultrasonic pulses. The vibration propagating plate 8 propagates the ultrasonic vibration (plate wave) received from the vibration pen 3 to vibration sensors 6a to 6c comprising piezoelectric elements or the like attached to the corner portions of the plate 8. The plate 8 is made of, for instance, an acrylic plate, a glass plate, or the like. Reference numeral 7 indicates a reflection preventing material for supporting the plate 8 and preventing the ultrasonic vibration propagated in the plate 8 from being reflected by its peripheral portions and returned to the direction of the central portion of the plate 8. The reflection preventing material 7 is made of, for example, a silicon rubber or the like. Reference numeral 9 represents a signal waveform detector for outputting corresponding detection timing signals in accordance with the detection signals of the ultrasonic vibration which were detected by the vibration sensors 6a to 6c, respectively. Reference numeral 1 denotes a controller for executing the main control of the apparatus in the embodiment and calculating the input coordinates. That is, the controller 1 sends an ultrasonic pulse signal to the vibrator driver 2 and starts an internal timer. The controller 1 also detects the vibration propagation times which are required until the vibration is transferred to the vibration sensors 6a to 6c from the time point when the pulse signal was sent on the basis of detection timing signals which were input from the signal waveform detector 9. On the basis of the detected vibration propagation time information, the controller 1 calculates the input coordinates (x, y) of the vibration pen 3 on the vibration propagating plate 8.

Further, the controller 1 variously uses the calculated input coordinates (x, y). For instance, on the basis of the input coordinates (x, y) obtained, the controller 1 variously controls the outputting operation of a display 11' through a display driver 10. In this case, the plate 8 is laid over the display 11' comprising preferably a CRT, a liquid crystal display, or the like which can display dots. The display 11' displays dots at the position corresponding to the position on the plate 8 which was traced by the vibration pen 3. That is, the dots are displayed at the position on the display 11' corresponding to the vibration pen 3. Therefore, when the pen 3 is moved, an image which is constructed by the elements such as points, lines, or the like appears in accordance with the locus of the pen 3 as if it was written on a paper. Or, it is also possible to use other information input method whereby a menu is displayed on the display 11' and a desired item is selected from the menu by using the vibration pen 3 or whereby a prompt is displayed and the vibration pen 3 is touched to a predetermined position, or the like.

Figure 2:
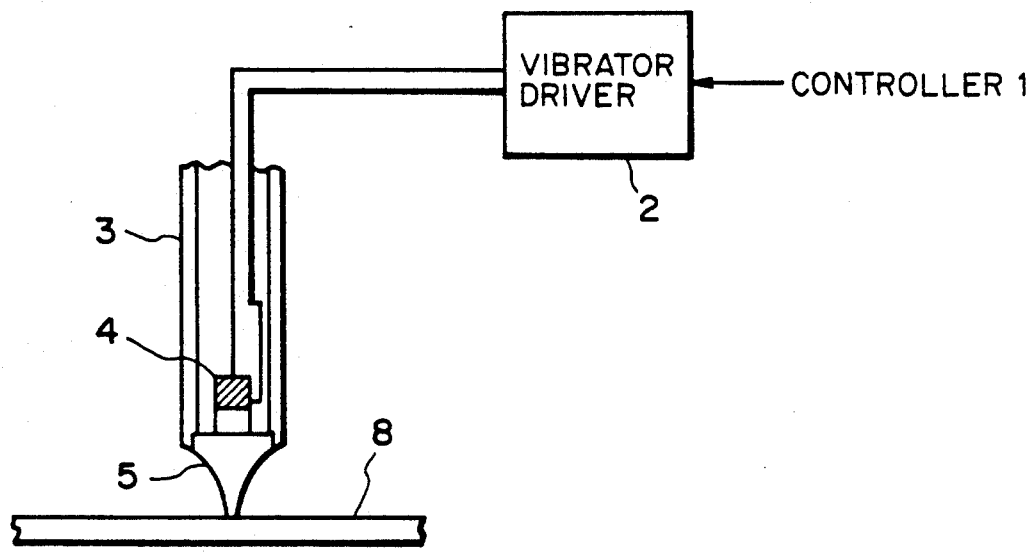
FIG. 2 is a diagram showing a structure of a vibration pen 3 in the first embodiment.

FIG. 2 is a diagram showing a structure of the vibration pen 3 in the first embodiment. The same parts and components as those shown in FIG. 1 are designated by the same reference numerals. In the diagram, an ultrasonic pulse signal of a low level (for instance, 5 V or the like) is sent from the controller 1. The vibrator driver 2 is an amplifying circuit whose output can be driven by a low impedance and amplifies a low level input pulse signal by a predetermined gain and applies the amplified signal to the vibrator 4. The vibrator 4 converts the electrical drive signal into the mechanical ultrasonic vibration. The ultrasonic vibration is amplitude amplified through the horn portion 5 and is transferred to the plate 8. A vibrating frequency of the vibrator 4 is selected to be a value within a range in which a plate wave can be generated from the vibration propagating plate 8 made of an acrylic plate, a glass plate, or the like. When driving the vibrator 4, there is selected a vibrating mode such that the vibrator 4 vibrates mainly in the direction perpendicular to the surface of the plate 8. By setting the vibrating frequency of the vibrator 4 to a resonance frequency of the vibrator 4, the vibration can be efficiently converted. Since the elastic wave which is propagated to the plate 8 is the plate wave as mentioned above, there is an advantage such that it is difficult to be influenced by scratches, obstacles, or the like on the surface of the plate 8 as compared with the surface wave.

Figure 3:
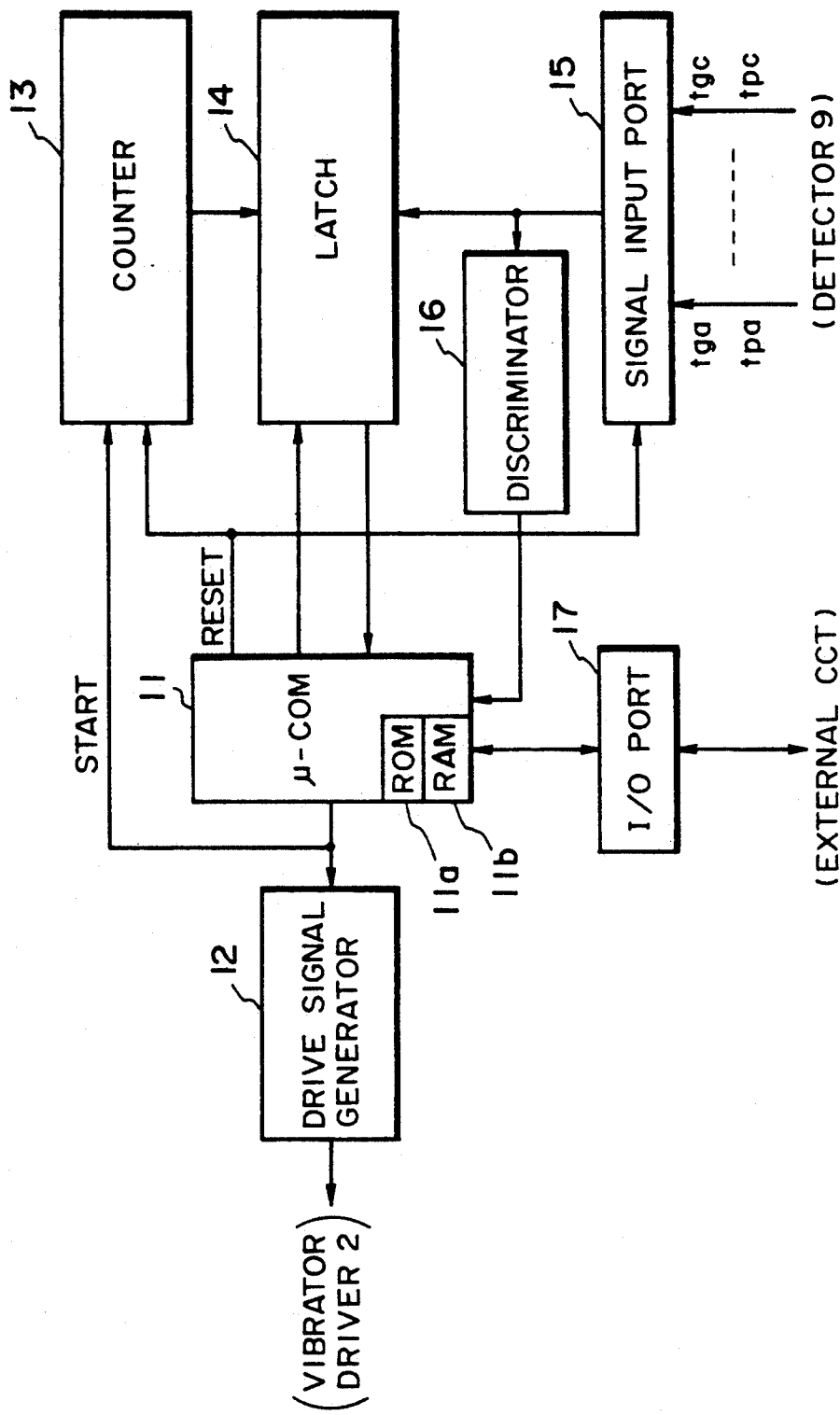
FIG. 3 is a block constructional diagram of a controller 1 in the first embodiment.

FIG. 3 is a block constructional diagram of the controller 1 in the first embodiment. In the diagram, reference numeral 11 denotes a microcomputer (CPU) for executing various operations and control. Reference numeral 11a indicates an ROM in which control programs (not shown) which are executed by the CPU 11 are stored; 11b indicates an RAM which is used as a work area by the CPU 11; and 12 represents a drive signal generator to output a drive pulse signal of a predetermined frequency to the vibrator driver 2 synchronously with a start signal from the CPU 11. The start signal from the CPU 11 also starts the time counting operation by a timer counter 13.

On the other hand, the signal waveform detector 9 receives the detection outputs of the vibration sensors 6a to 6c and outputs various detection timing signals (timing pulse signals) to measure the vibration propagation times. Those signals include: detection timing signals $t_{ga}$ to $t_{gc}$ of an envelope group signal and detection timing signals $t_{pa}$ to $t_{pc}$ of a phase signal, which will be explained hereinlater. The detection timing signals are generated at the timings corresponding to the distances between the vibration pen 3 and the vibration sensors 6a to 6c and are input to a detection signal input port 15 by parallel wirings. Reference numeral 14 indicates a latch circuit for latching the content (vibration propagation times) of the counter 13 in response to the inputs of the detection timing signals and holding them into memory areas corresponding to the sensors 6a to 6c, respectively. Reference numeral 16 denotes a discriminator for discriminating whether the detection timing signals from all of the sensors 6a to 6c have been input or not. If they have been input, the discriminator 16 outputs a signal indicative of such a fact to the CPU 11. Thus, the CPU 11 calculates the coordinates (x, y) of the position on the plate 8 at which the vibration pen 3 was put on the basis of the vibration propagation times regarding the sensors 6a to 6c. Reference numeral 17 denotes an I/O port. An external circuit such as a display 11' is controlled through the I/O port 17.

If a discrimination signal from the discriminator 16 is not input to the CPU 11 even after the elapse of the maximum time which is determined by the operation delay time of each electronic circuit in the embodiment and the maximum delay time of the vibration propagation and the like, the CPU 11 does not calculate the coordinates but outputs a reset signal and repeats the above operations.

Figure 4:
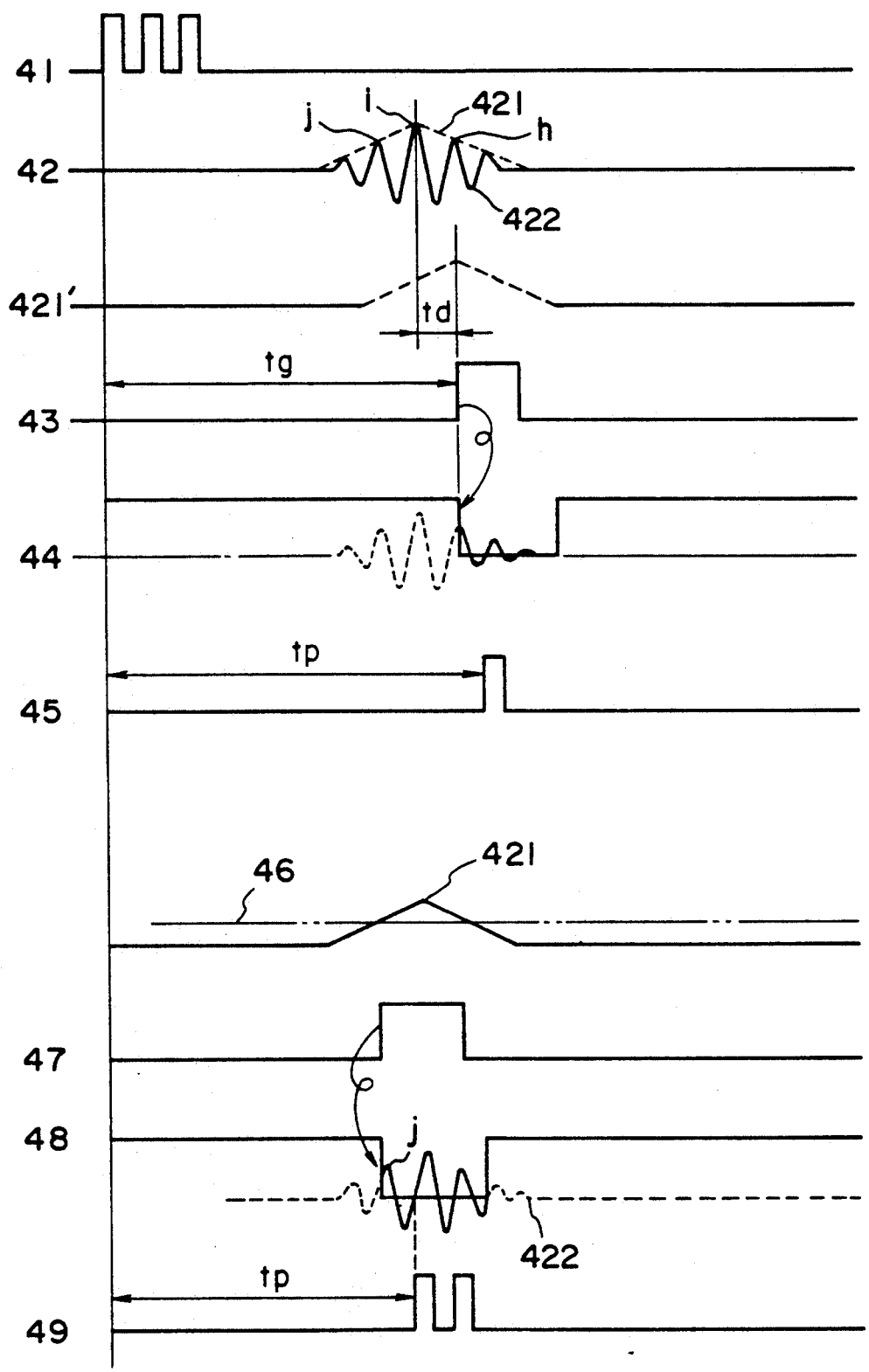
FIG. 4 is a timing chart for explaining a state of the vibration propagation of the first embodiment.

FIG. 4 is a timing chart for explaining a state of the vibration propagation in the first embodiment. In the diagram, reference numeral 41 denotes an ultrasonic pulse signal generated from the drive signal generator 12. The signal 41 comprises a few pulses. The vibrator 4 ultrasonic vibrates on the basis of the ultrasonic pulse signal 41. The ultrasonic vibration is transferred to the plate 8 through the horn portion 5. Further, the ultrasonic vibration is propagated by the plate 8 and detected by the sensors 6a to 6c. Reference numeral 42 indicates a signal detected by, for example, the sensor 6a. The signal 42 is delayed by only the delay time corresponding to a vibration propagation distance d.

Since the plate wave in the embodiment is the dispersive lateral wave, the relative relation (phase) between a detection waveform 422 (hereinafter, also referred to as a phase signal 422) and an envelope signal 421 extracted from the detection waveform 422 changes in dependence on the vibration propagation distance d. Practically speaking, for instance, assuming that the vibration pen 3 continuously moves away from the sensor 6a, in the case where such a state is observed by a synchroscope, at first, the maximum peak exists on the side of h of the signals 422, then the maximum peak is shifted to the side of i as shown in the diagram. When the pen 3 further moves away from the sensor 6a, the maximum peak is shifted to the side of j. On the other hand, when the motion of the pen 3 is reversed, the shifting operation of the maximum peak is also reversed.

It is now assumed that a progressing velocity of the envelope signal 421 is set to a group velocity $V_g$ and a progressing velocity of the phase signal 422 is set to a phase velocity $V_p$. The distance d between the vibration pen 3 and each of the vibration sensors 6a to 6c is obtained as follows on the basis of the group velocity $V_g$ and the phase velocity $V_p$.

First, an attention is paid to only the envelope signal 421. The propagation time by the group velocity $V_g$ is detected by detecting the arrival of a certain characteristic point on the envelope signal 421, for instance, the peak point on the envelope signal 421. If a method whereby the peak point on the envelope signal 421 is detected by comparing two continuous peak values of the phase signal 422 is used, the detection time point of the peak point on the envelope signal 421 is delayed by at least the time corresponding to one wavelength of the phase signal 422. Reference numeral 43 denotes a detection timing signal (hereinafter referred to as a "group signal") of the peak point on the envelope signal 421 in this case. The time $t_g$ from the generation time point of the pulse signal 41 to the detection time point of the peak point is the vibration propagation time by the group velocity $V_g$. In addition, since the group velocity $V_g$ has already been known, the distance d between the pen 3 and each of the sensors 6a to 6c is obtained by the following equation (1).

$$d = V_g \cdot t_g \tag{1}$$

Since set of the phase signal 422 are set to one wave, the resolution (accuracy) of the envelope signal 421 is lower than that in the case of the waves of the phase signal 422. On the other hand, if a special wave of the phase signal 422 corresponding to a special pulse vibration applied can be always detected, the accurate distance d can be obtained by ($d = V_p \cdot t_p$). However, it is difficult to always detect such a special wave. Therefore, attention is paid to the phase between the envelope signal 421 and the phase signal 422.

For instance, it is now assumed that a threshold value signal 44 of a predetermined width is formed from a certain special point on the phase signal 422, that is, from the peak detection time point regarding the envelope signal 421 from the generation time point of the pulse signal 41 and the first leading zero-cross point of the phase signal 422 which appears first during this interval is detected and a pulse signal (hereinafter referred to as a "phase signal") 45 is obtained. When the time until the pulse signal 45 is obtained assumes $t_p$, the distance between the pen 3 and each of the sensors 6a to 6c can be obtained by equation (2).

$$d = n \cdot \lambda_p + V_p \cdot t_p \tag{2}$$

where,
$\lambda_p$: wavelength of the elastic wave
n: integer

In the equation (2), the value of integer n changes such as 0, 1, 2, ... as the maximum peak position of the phase signal 422 is shifted from the side of h to the side of j as mentioned above. This is because since the peak detection time point of the envelope signal 421 is shifted as the maximum peak position of the phase signal 422 is shifted, the wave of the phase signal 422 which is used to detect the vibration propagation time $t_p$ is also moved from the side of h to the side of j. Therefore, in consideration of the equations (1) and (2), the case where a certain waveform in the phase signal 422 is used is used as a reference. Assuming that the wave which is at present being used is used within a range such that the phase deviation between the peak detection time point of the envelope signal 421 and the wave of the phase signal which is at present used does not exceed a predetermined value from such a reference point, it is sufficient to update the value of n in accordance with the equation (3).

$$n = \left( \frac{V_g \cdot t_g - V_p \cdot t_p}{\lambda_p} + \frac{1}{N} \right) \tag{3}$$

[ ] denotes a Gaussian symbol. On the other hand, N indicates a real number other than "0" and is set to a proper numerical value. For instance, assuming that N=2, the value of n can be updated every ±½ wavelength of the detection accuracy of the envelope peak. That is, the value of n is updated such that 0=[−½+½], 0=[0+½], and 1=[½+½]. By substituting the value of n obtained by the equation (3) into the equation (2), the accurate distance d can be obtained.

In the above example, the peak detection time of the envelope signal 421 includes at least the delay time $t_d$ of one wavelength or more of the phase signal 422. Therefore, the envelope signal is substantially delayed like a signal 421' and it is undesirable to se such a delayed signal as a reference for the phase signal detection. A method of detecting the phase signal in the first embodiment will now be described hereinbelow.

FIG. 5 is a block constructional diagram of the signal waveform detector in the first embodiment. In the diagram, reference numeral 51 denotes a prestage amplifier to amplify the output signal of each of the vibration sensors 6a to 6c to a predetermined level. Reference numeral 52 indicates an envelope detector to extract an envelope signal from the amplified signal (FIG. 6) and 53 represents an envelope peak detector for detecting the peak of the envelope signal and triggering a $t_g$- detector 54 at the peak detection timing. The $t_g$-detector 54 comprises, for instance, a mono-stable multi-vibrator. The controller 1 obtains the vibration propagation time $t_g$ by the group velocity on the basis of the output of the counter 13 at the reception timing of the $t_g$ detection pulse signal.

On the other hand, reference numeral 55 denotes a signal detector to form a pulse signal 47 of the portion exceeding a threshold signal 46 of a predetermined level in the envelope signal 421 detected by the envelope detector 52. Reference numeral 56 denotes a mono-stable multi-vibrator for generating a gate signal 48 of a predetermined time width which was triggered by the first leading edge of the pulse signal 47. Reference numeral 57 indicates a $t_p$-comparator for detecting the zero-cross point of the first leading edge of the phase signal 422 for the interval during which the gate signal 48 is ON and outputting a phase detection signal 49 of the time $t_p$.

FIG. 6 is a block constructional diagram of the envelope detector 52 in the first embodiment. In the diagram, reference numeral 521 indicates an absolute value generator for synthesizing the pre-stage amplified detection signal and its inverted amplified signal by matching the gains and for outputting an absolute value signal. Reference numeral 522 denotes a low pass filter (LPF) for allowing the low frequency component of the absolute value signal to be passed. In this example, the envelope signal 421 is output. Thus, the noise component in the detection signal is eliminated and an always stable reference gate signal can be provided.

Figure 15A:
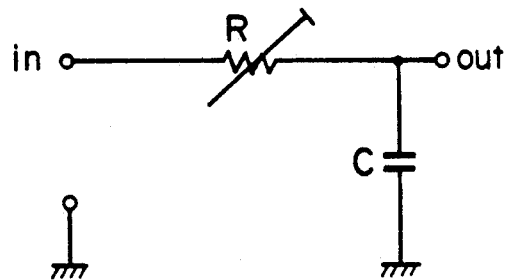
FIGS. 15A and 15B are diagrams showing examples of LPF circuits in the first embodiment.
Figure 15B:
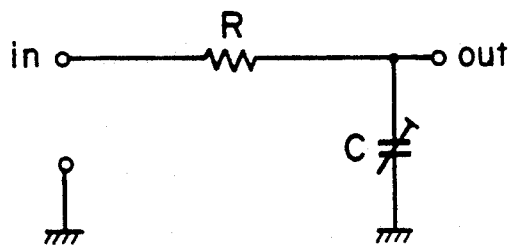

FIGS. 15A and 15B are diagrams showing examples of the LPF in the first embodiment. In the diagrams, if a resistor R or a capacitor C is made variable, a cut-off frequency can be easily adjusted. On the other hand, the LPF 522 can be also constructed by a coil L and a capacitor C or by an active filter.

As mentioned above, the controller 1 calculates the propagation time $t_p$ by the phase velocity $V_p$ on the basis of the output of the counter 13 at the generation timing of the first detection pulse signal 49. Such a construction of the waveform detector 9 is provided for every system of the vibration sensors 6a to 6c, so that the accurate distance from the coordinate input point to each of the sensors 6a to 6c is obtained.

In the above method, a consideration must be also paid to a change in level of the detection signal 422 due to writing pressure, the vibration propagation distance, and the like by the vibration pen 3. That is, since the level of the threshold signal 46 has been fixed as mentioned above, when the level of the detection signal 422 changes, the level of the envelope signal 421 also changes and the generation position of the first detection pulse signal 49 also varies. For example, when the level of the envelope signal 421 is low, the detection signal 49 of the time $t_p$ is delayed by the time corresponding to one wavelength. However, such a delay is always set to the time which is integer times as long as one wavelength. Therefore, the delay is corrected by the controller 1. For instance, when the detection signal 49 of the time $t_p$ is detected for the time interval within two wavelengths for the detection signal of the time $t_g$, the detection signal 49 of the time $t_p$ is used as it is. However, when there is a time deviation of two wavelengths or more, the delay time is corrected so as to become the time within two wavelengths for the detection signal 43 of the time $t_g$. That is, the delay time is corrected in a manner such that the value which is obtained by adding the time which is integer times as long as the wavelength to the time $t_p$ which was actually detected is included in the time within two wavelengths. The resultant time $t_p$ is used for the calculation.

Although a discrimination regarding whether the correction is executed or not has been made by checking to see if the time deviation is within two wavelengths or not, such a discrimination reference may be also set to one wavelength or three wavelengths.

The controller 1 latches the content of the counter 13 into the latch circuit 14 in accordance with the detection timing signals $t_{ga}$ to $t_{gc}$ and $t_{pa}$ to $t_{pc}$. On the basis of those values, the CPU 11 calculates the distances $d_a$ to $d_c$ between the vibration pen 3 and the vibration sensors 6a to 6c in accordance with the equations (2) and (3). It is sufficient that the number of vibration sensors is arbitrarily set to two or more.

Figure 7:
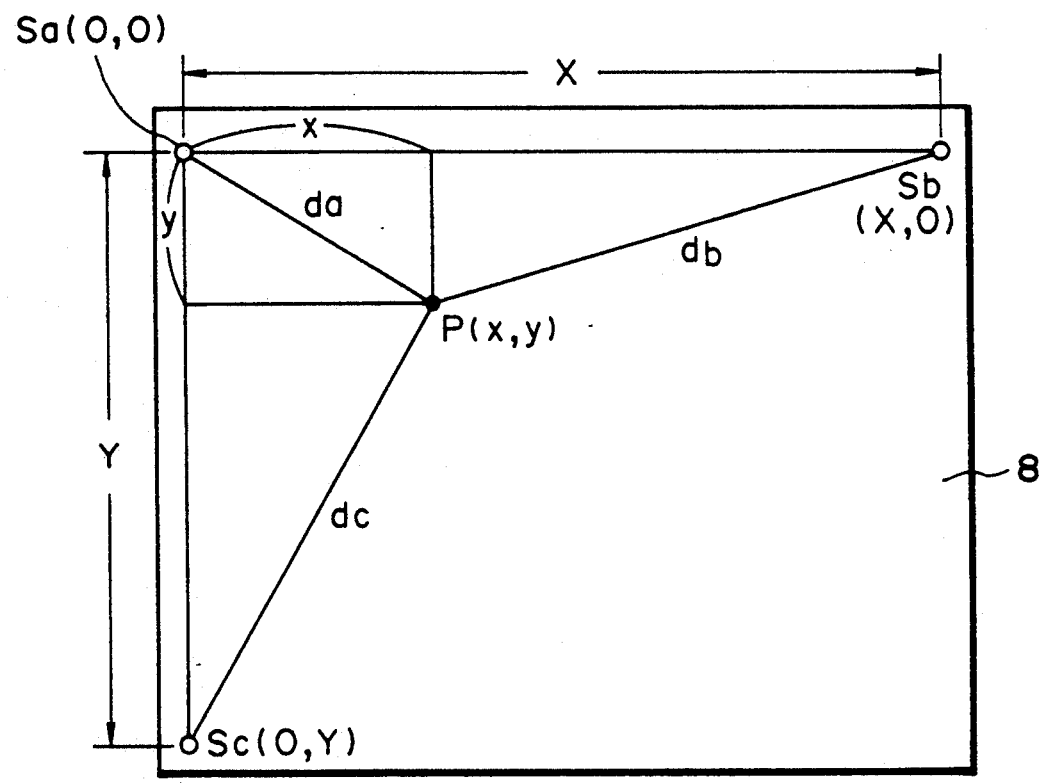
FIG. 7 is a diagram for explaining a coordinate calculating process in the first embodiment.

FIG. 7 is a diagram for explaining the coordinate calculating process in the first embodiment. In the diagram, three vibration sensors 6a to 6c are attached to the corner portions of the vibration propagating plate 8. It is assumed that the coordinates of the sensors are set to $S_1$ (O, O) for the sensor 6a, $S_3$ (O, Y) for the sensor 6b, and $S_2$ (X, O) for the sensor 6c. According to the theorem of three squares, the coordinates (x, y) of an input point P are obtained by the equations (4) and (5).

$$x = \frac{x}{2} + \frac{(d_1 + d_2)(d_1 - d_2)}{2X} \tag{4}$$

$$y = \frac{y}{2} + \frac{(d_1 + d_3)(d_1 - d_3)}{2Y} \tag{5}$$

By repeating the above operation, the input coordinates can be detected in a real-time manner.

Second Embodiment

The second embodiment relates to the case where a gate signal is generated by comparing the primary differential output signal of the output signal of the filter circuit with a predetermined threshold value. The portions which are not particularly described are similar to those in the first embodiment hereinbelow.

Figure 8:
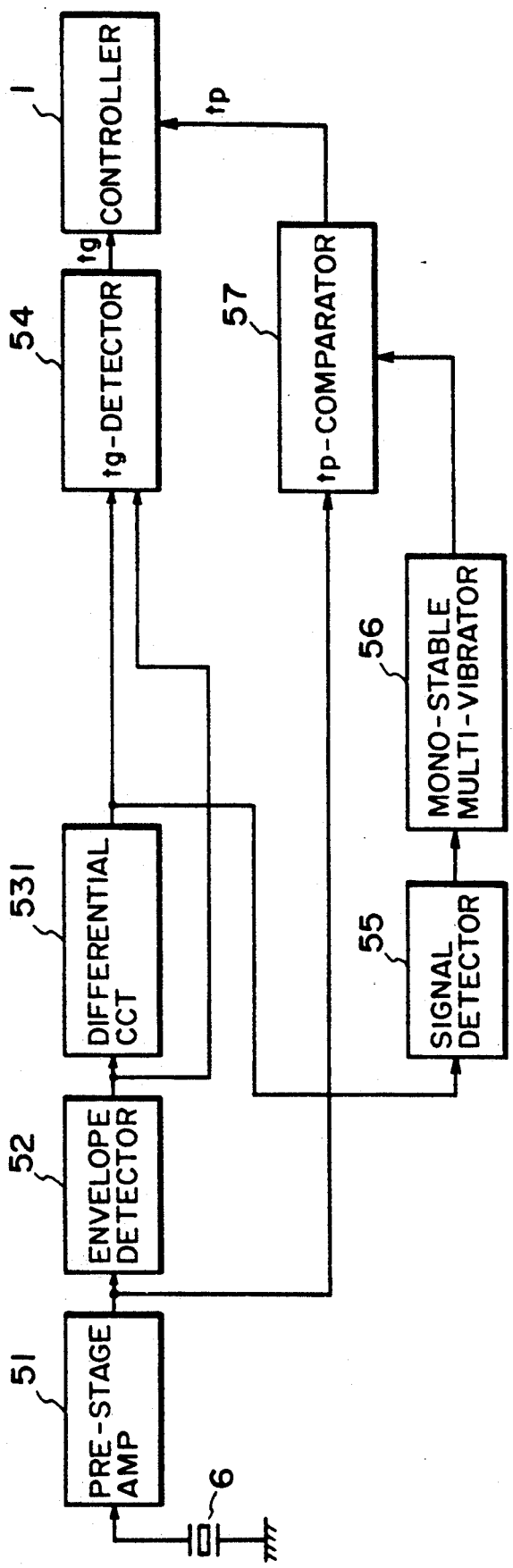
FIG. 8 is a block constructional diagram of a signal waveform detector in the second embodiment.
Figure 9:
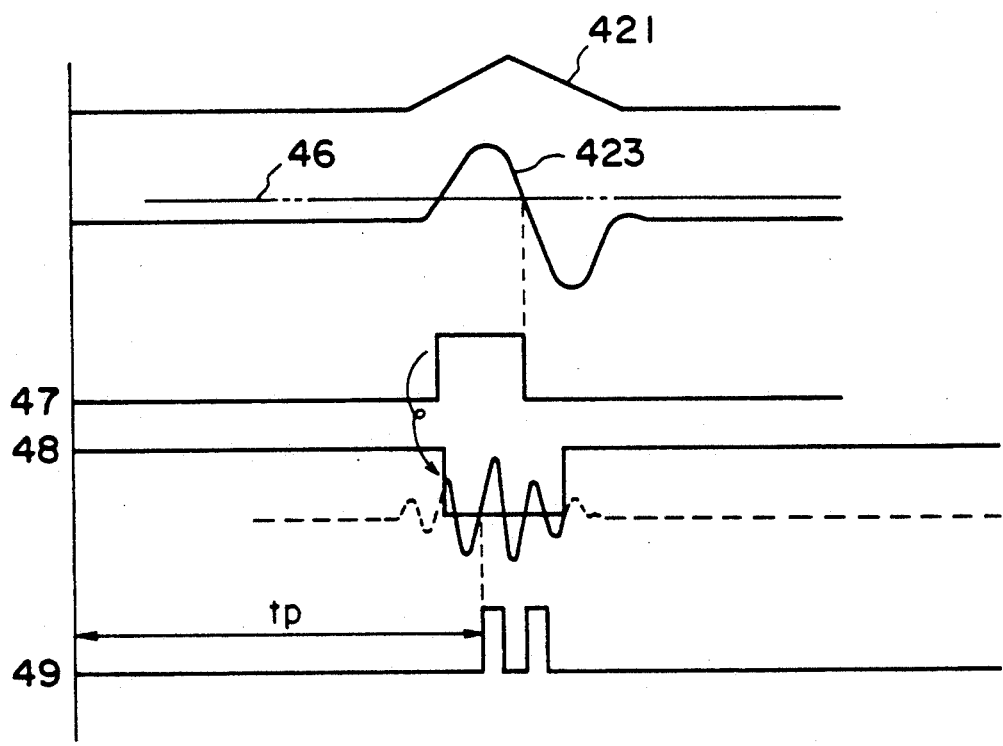
FIG. 9 is a timing chart for the operation in FIG. 8.

FIG. 8 is a block constructional diagram of a signal waveform detector in the second embodiment. FIG. 9 is a timing chart for the operation of FIG. 8. In the second embodiment, a primary differential signal 423 is formed by differentiating the envelope signal 421 by a differential circuit 531 and compared with the predetermined threshold value 46, thereby stabilizing the formation of the gate signal. The differential circuit 531 comprises, for instance, a high pass filter. Therefore, the differential signal 423 is a signal which was further subjected to the filtering process (noise elimination) than the envelope signal. Thus, it is more effective to present an erroneous detection.

Third Embodiment

The third embodiment relates to the case where a gate signal is generated by comparing the secondary differential output signal of the output signal of the filter circuit with a predetermined threshold value.

Figure 10:
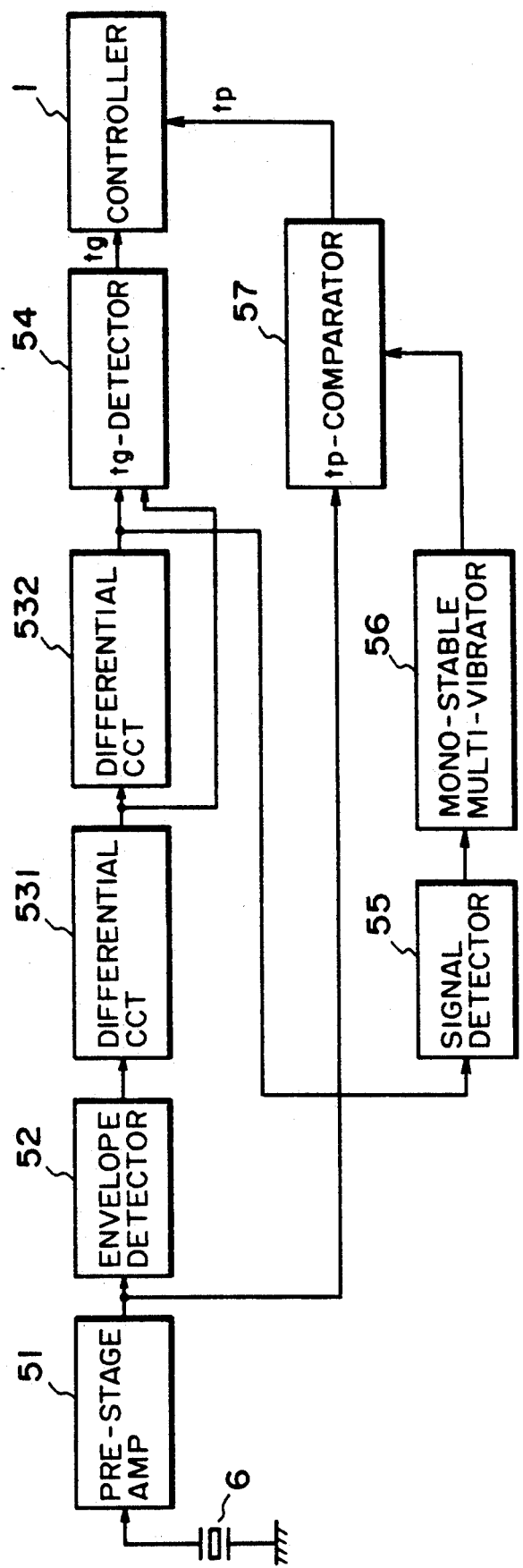
FIG. 10 is a block constructional diagram of a signal in the third embodiment.
Figure 11:
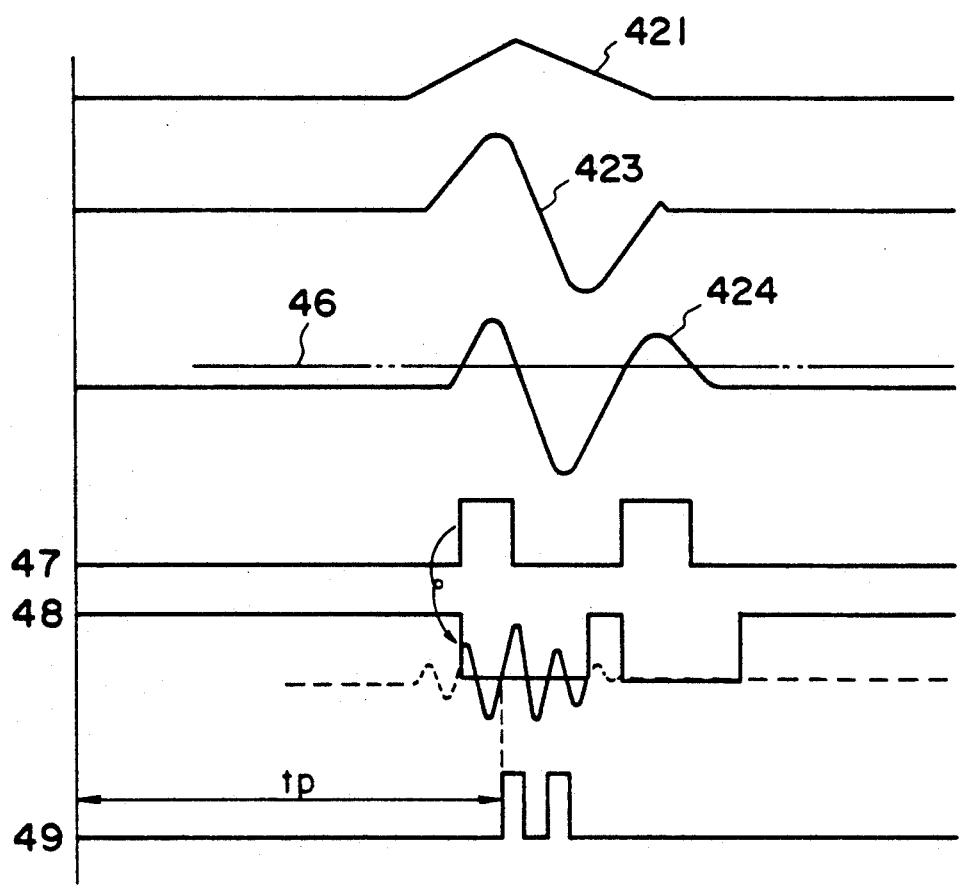
FIG. 11 is a timing chart for the operation in FIG. 10.
Figure 14:
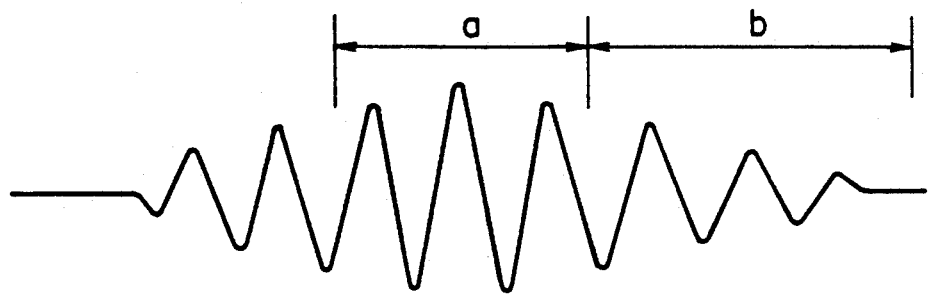
FIG. 14 is a diagram showing an example of a signal detected by a vibration sensor.

FIG. 10 is a block constructional diagram of a signal waveform detector in the third embodiment. FIG. 11 is a timing chart for the operation of FIG. 10.

In the third embodiment, a secondary differential signal 424 is formed by differentiating the envelope signal 421 twice by differential circuits 531 and 532 and compared with the predetermined threshold value 46, thereby stabilizing the formation of the gate signal. For instance, the differential circuit 532 comprises a high pass filter. Therefore, the differential signal 424 is a signal which was further subjected to the filtering process (noise elimination) than the second embodiment. Thus, it is more effective to prevent an erroneous detection.

Fourth Embodiment

FIG. 12 is a block constructional diagram of the envelope detector 52 in the fourth embodiment. In the diagram, reference numeral 71 indicates an absolute value generator to form the absolute value signal of the detection signal 422. For instance, the absolute value generator 71 comprises a full-wave rectifier. Reference numeral 72 denotes a band pass filter (BPF) having a band width for allowing the envelope signal component to be passed.

FIGS. 13A and 13B are diagrams showing frequency characteristics of the low pass filter (LPF) and the band pass filter (BPF) in the embodiment. As will be obvious from the diagrams, the BPF in the fourth embodiment cuts off the phase signal frequency component as a carrier frequency in the high band and can also cut off external disturbance components which are caused, for instance, when the vibration pen pressed in the low band.

For instance, even in the case where the $t_g$-detector detects the peak of the envelope signal as a zero-cross point of the primary differentiation of the envelope signal, the external disturbance of the low frequency component exerts an influence on the detection of the zero-cross point of the primary differentiation. Therefore, such an external disturbance can be prevented by inserting a BPF at least before the detection of the characteristic point of the envelope signal.

In the embodiment, although the BPF 72 has been provided in the envelope detector 52, the invention is not limited to such a construction. It is also possible to use another construction in which, for instance, a high pass filter (HPF) is constructed by inserting a coupling capacitor (not shown) between the vibration sensor 6 and the pre-stage amplifier 51 or between the pre-stage amplifier 51 and the envelope detector 52 and is coupled with an LPF to cut off the carrier frequency.

What is claimed is:

1. A coordinate input apparatus in which a vibration which was input by a vibration input pen is detected by vibration sensors attached to a vibration propagating plate and coordinates of the vibration input pen on the vibration propagating plate are detected, comprising:

envelope output means comprising a filter for outputting an envelope signal of the detected signals for each of the vibration sensors;

gate signal output means for detecting a portion, exceeding a predetermined threshold value, of said envelope signal which is output from said filter and for outputting a gate signal;

first detecting means for detecting a peak of said envelope signal which is output from said envelope output means and for detecting a signal based on a group velocity by using said peak as a reference;

second detecting means for detecting, before the signal based on the group velocity is detected by said first detecting means, a signal based on a phase velocity by using a leading edge of said detection signal of one of the vibration sensors as a reference in the period of time during which the gate signal is output from the gate signal output means; and deriving means for deriving the position coordinates of the vibration input pen on the basis of a propagation time of the signal based on the group velocity detected by said first detecting means and a propagation time of the signal based on the phase velocity detected by said second detecting means.

2. An apparatus according to claim 1, wherein said filter means is a low pass filter.

3. An apparatus according to claim 1, wherein said filter means is a band pass filter.

4. An apparatus according to claim 1, wherein the vibration input pen includes a piezoelectric element for generating a vibration and drive means for driving the piezoelectric element to thereby generate the vibration.

5. An apparatus according to claim 1, wherein the vibration sensors are constructed of piezoelectric elements and are attached to a plurality of positions of the vibration propagating plate.

6. An apparatus according to claim 1, wherein said deriving means comprises a counter to measure the propagation time of the signal based on the group velocity and the propagation time of the signal based on the phase velocity.

7. An apparatus according to claim 1, wherein the vibration propagating plate is made of a transparent plate-like material and a display is arranged under the vibration propagating plate.

8. An apparatus according to claim 1, wherein said envelope output means is a circuit to output an absolute value signals of the detection signal.

9. An apparatus according to claim 1, wherein said first detecting means includes peak detecting means for detecting said peak of the envelope signal.

10. A coordinate input apparatus in which a vibration which was input by a vibration input pen is detected by vibration sensors attached to a vibration propagating plate and coordinates of the vibration input pen on the vibration propagating plate are detected, comprising:

envelope output means comprising a filter for outputting an envelope signal of the detected signals for each of the vibration sensors;

differentiating means for outputting an n-order, where n is a positive integer, differential signal of the filtered envelope signal which is output from said filter;

gate signal output means for detecting a portion, exceeding a predetermined threshold value, of the n-order differential signal which is output from said differentiating means and for outputting a gate signal;

first detecting means for detecting a peak of the envelope signal which is output from said envelope output means and for detecting a signal based on a group velocity by using the peak as a reference;

second detecting means for detecting, before the signal based on the group velocity is detected by said first detecting means, a signal based on a phase velocity by using a leading edge of the detection signal of one of the vibration sensors as a reference in a period of time during which the gate signal is output from the gate signal output means; and deriving means for deriving the position coordinates of the vibration input pen on the basis of a propagation time of the signal based on the group velocity detected by said first detecting means and a propagation time of the signal based on the phase velocity detected by said second detecting means.

11. An apparatus according to claim 10, wherein said filter means is a low pass filter.

12. An apparatus according to claim 10, wherein said filter means is a band pass filter.

13. An apparatus according to claim 10, wherein said vibration input pen includes a piezoelectric element to generate a vibration and drive means for driving said piezoelectric element to thereby generate the vibration.

14. An apparatus according to claim 10, wherein the vibration sensors are constructed of piezoelectric elements and are attached to a plurality of positions of the vibration propagating plate.

15. An apparatus according to claim 10, wherein said deriving means comprises a counter to measure the propagation time of the signal based on the group velocity and the propagation time of the signal based on the phase velocity.

16. An apparatus according to claim 10, wherein said vibration propagating plate is made of a transparent plate-like material and a display is arranged under the vibration propagating plate.

17. An apparatus according to claim 10, wherein said envelope output means is a circuit to output an absolute value signal of the detection signal.

18. An apparatus according to claim 10, wherein said n-order differentiating means is a high pass filter.

19. An apparatus according to claim 10, wherein said first detecting means includes peak detecting means for detecting the peak of the envelope signal.

20. A coordinate input apparatus comprising:
vibration input means for inputting a vibration;
a vibration propagating member for propagating the vibration which is input by said vibration input means;
vibration sensors for detecting the vibration which is propagated in said vibration propagating member and for outputting detection signals;
envelope output means comprising a filter for outputting an envelope signal of the detected signals for each of the vibration sensors;
gate signal output means for detecting a portion, exceeding a predetermined threshold value, of the envelope signal which is outputted from said filter and for outputting a gate signal;
first detecting means for detecting a peak of the envelope signal which is output from said envelope output means and for detecting a signal based on a group velocity by using the peak as a reference;
second detecting means for detecting, before the signal based on the group velocity is detected by said first detecting means, a signal based on a phase velocity by using a leading edge of said detection signal of one of the vibration sensors as a reference in a period of time during which the gate signal is output from said gate signal output means; and deriving means for deriving the position coordinates of said vibration input means on the basis of a propagation time of the signal based on the group velocity detected by said first detecting means and a propagation time of the signal based on the phase velocity detected by said second detecting means.

21. An apparatus according to claim 20, wherein said filter means is a low pass filter.

22. An apparatus according to claim 20, wherein said filter means is a band pass filter.

23. An apparatus according to claim 20, wherein said vibration input means includes a piezoelectric element to generate a vibration and drive means for driving said piezoelectric element to thereby generate the vibration.

24. An apparatus according to claim 20, wherein said vibration sensors are constructed of piezoelectric elements and are attached to a plurality of positions of said vibration propagating member.

25. An apparatus according to claim 20, wherein said deriving means comprises a counter to measure the propagation time of the signal based on the group velocity and the propagation time of the signal based on the phase velocity.

26. An apparatus according to claim 20, wherein said vibration propagating member is made of a transparent plate-like material and wherein said apparatus further comprises a display arranged under said vibration propagating member.

27. An apparatus according to claim 20, wherein said envelope output means is a circuit which outputs an absolute value signal of the detection signals.

28. An apparatus according to claim 20, wherein said first detecting means includes peak detecting means for detecting the peak of the envelope signal.

29. A coordinate input apparatus comprising:
vibration input means for inputting a vibration;
a vibration propagating member for propagating the vibration which is input by said vibration input means;
vibration sensors for detecting the vibration which is propagated in said vibration propagating member and for outputting detection signals;
envelope output means comprising a filter for outputting an envelope signal of the detected signals for each of the vibration sensors;
differentiating means for outputting an n-order, where n is a positive integer, differential signal of the filtered envelope signal which is output from said filter;
gate signal output means for detecting a portion, exceeding a predetermined threshold value, of the n-order differential signal which is output from said differentiating means and for outputting a gate signal;
first detecting means for detecting a peak of the envelope signal which is output from said envelope output means and for detecting a signal based on a group velocity by using the peak as a reference;
second detecting means for detecting, before the signal based on the group velocity is detected by said first detecting means, a signal based on a phase velocity by using a leading edge of said detection signal of one of the vibration sensors as a reference in a period of time during which the gate signal is output from said gate signal output means; and deriving means for deriving the position coordinates of said vibration input means on the basis of a propagation time of the signal based on the group velocity detected by said first detecting means and a propagation time of the signal based on the phase velocity detected by said second detecting means.

30. An apparatus according to claim 29, wherein said filter means is a low pass filter.

31. An apparatus according to claim 29, wherein said filter means is a band pass filter.

32. An apparatus according to claim 29, wherein said vibration input means includes a piezoelectric element to generate a vibration and drive means for driving said piezoelectric element to thereby generate the vibration.

33. An apparatus according to claim 29, wherein said vibration sensors are constructed of piezoelectric elements and are attached to a plurality of positions of said vibration propagating member.

34. An apparatus according to claim 29, wherein said deriving means comprises a counter to measure the propagation time of the signal based on the group velocity and the propagation time of the signal based on the phase velocity.

35. An apparatus according to claim 29, wherein said vibration propagating member is made of a transparent plate-like material and wherein said apparatus further comprises a display arranged under the vibration propagating member.

36. An apparatus according to claim 29, wherein said envelope output means is a circuit to output an absolute value signal of the detection signals.

37. An apparatus according to claim 29, wherein said first detecting means includes peak detecting means for detecting the peak of the envelope signal.

* * * * *

UNITED STATES PATENT AND TRADEMARK OFFICE
CERTIFICATE OF CORRECTION

PATENT NO. : 5,253,187

DATED : October 12, 1993

INVENTOR(S) : Kiyoshi KANEKO et al.

It is certified that error appears in the above-indentified patent and that said Letters Patent is hereby corrected as shown below:

<u>On the Cover Page</u>
    At [56] References Cited, "4,662,282 5/1987 Sato et al." should read --4,665,282 5/1987 Sato et al.

At [57] Abstract
        Line 18, "output" should read --is output--.
        Line 19, "is" should be deleted.

<u>Column 1</u>
    Line 27, "group" should be deleted.
    Line 34, "group" should be deleted.
    Line 48, "group" should be deleted.
    Line 56, "being" should be deleted.

<u>Column 4</u>
    Line 39, "an" should read --a--.
    Line 41, "an" should read --a--.
    Line 53, "group" should be deleted.

<u>Column 5</u>
    Line 20, "ultrasonic" should read --ultrasonically--.

<u>Column 6</u>
    Line 6, "Since set of" should read --Since a set of waves of--.
    Line 24, "(hereinafter re-" should be deleted.
    Line 25, "ferred to as a "phase signal")" should be deleted.

<u>Column 7</u>
    Line 3, "se" should read --use--.
    Line 19, "velocity" should read --velocity $V_g$--.

UNITED STATES PATENT AND TRADEMARK OFFICE
CERTIFICATE OF CORRECTION

PATENT NO. : 5,253,187
DATED : October 12, 1993
INVENTOR(S) : Kiyoshi KANEKO et al.

It is certified that error appears in the above-indentified patent and that said Letters Patent is hereby corrected as shown below:

Column 9
    Line 43, "pressed" should read --is pressed--.

Column 10
    Line 48, "signals" should read --signal--; and "signal." should read --signals.--.

Column 11
    Line 41, "signal." should read --signals.--.

Signed and Sealed this

Fourteenth Day of February, 1995

Attest:

BRUCE LEHMAN

*Attesting Officer*     *Commissioner of Patents and Trademarks*